US006711222B1

United States Patent
Piunno, Jr. et al.

(10) Patent No.: US 6,711,222 B1
(45) Date of Patent: Mar. 23, 2004

(54) METHOD AND APPARATUS FOR PERFORMING FREQUENCY SYNTHESIS IN COMMUNICATION SYSTEMS

(75) Inventors: John Albert Piunno, Jr., Wickliffe, OH (US); Thomas Richard Heilman, Wickliffe, OH (US)

(73) Assignee: ABB Automation Inc., Wickliffe, OH (US)

( * ) Notice: Subject to any disclaimer, the term of this patent is extended or adjusted under 35 U.S.C. 154(b) by 604 days.

(21) Appl. No.: 09/663,334

(22) Filed: Sep. 18, 2000

(51) Int. Cl.[7] .............................. H04L 7/00; H03D 3/24
(52) U.S. Cl. ....................................... 375/355; 375/376
(58) Field of Search ................................. 375/355, 354, 375/376, 316, 373; 370/350, 503; 331/155, 47; 359/175, 157, 186, 187

(56) References Cited

U.S. PATENT DOCUMENTS 5,361,044 A * 11/1994 Norimatu et al. ............ 331/1 A
6,549,587 B1 * 4/2003 Li ................................ 375/326

* cited by examiner

Primary Examiner—Khai Tran
(74) Attorney, Agent, or Firm—Michael M. Rickin

(57) ABSTRACT

A method and apparatus for performing frequency synthesis in a communication system. A fiber optic repeater connected between a copper bus and a fiber optic cable includes a voltage controlled oscillator and associated circuitry to adjust the frequency at which the repeater operates to match the frequency of the device that generated the incoming data stream. This adjustment is performed on-both data received from the copper bus or the fiber optic cable on a message by message basis.

18 Claims, 4 Drawing Sheets

$f_C$ = BASED ON FREQUENCY OF LOCAL DEVICE
$f_O$ = BASED ON FREQUENCY OF REMOTE OPTIC DEVICE
$f_L$ = BASED ON FREQUENCY OF LOCAL VCO

METHOD AND APPARATUS FOR PERFORMING FREQUENCY SYNTHESIS IN COMMUNICATION SYSTEMS

FIELD OF THE INVENTION

This invention relates to communication systems and more particularly those systems where digital frequency synthesis is used for remote communication applications.

DESCRIPTION OF THE PRIOR ART

Frequency synthesis is used to track the frequency of an incoming data stream. Such synthesis typically uses some means to lock on to the frequency of the incoming data stream. One such means is the well known phase lock loop (PLL) a block diagram for which is shown in FIG. 1.

As is shown in FIG. 1, frequency synthesizer 10 includes a divide by n circuit 12 in the form of a digital counter which produces an output cycle for each n input cycles. Thus the signal at the output of circuit 12 has a frequency of $f_i/n$, where $f_i$ is the frequency of the signal at the input to synthesizer 10.

Phase detector 14 receives the output of circuit 12 and also receives an input from loop 16 comprising loop filter 16a, voltage controlled oscillator (VCO) 16b and divide by m circuit 16c which is also in the form of a digital counter that produces an output cycle for each m input cycles. The output of the PLL is at the output of the VCO 16b and if that output has a frequency of $f_o$ then the signal produced at the output of divide by m circuit 16c has a frequency of $f_o/m$. Thus the input frequencies to phase detector 14 are $f_i/n$ and $f_O/m$.

Under locked steady state conditions the PLL causes the input frequencies to phase detector 14 to be exactly equal, that is, $f_i/n=f_o/m$. The output frequency can then be expressed as:

$$f_o=(m/n)^* f_i.$$

One of the drawbacks to this method of frequency synthesis is that the PLL needs time to lock on to the frequency. During this time the data can not be reliably retrieved from the data stream necessitating a sacrificial preamble in front of every transmission.

An alternative technique to frequency synthesis in overcoming communication issues is commonly referred to as Store-Forward. One such prior art implementation for the Store-Forward technique is circuit 18 shown in FIG. 2. The Store-Forward method samples the incoming data stream 20 at sampler 28 with either a clock 30 supplied with that stream or with a clock recovered from the data stream by a clock recovery circuit 22 which is shown in dashed lines in FIG. 2. After a completed data frame has been received it is stored in a buffer 24 until it is retransmitted. Circuit 18 also includes a serial to parallel converter 32, a parallel to serial converter 34, an oscillator 26 and control logic 36.

The Store-Forward method requires that enough data be stored to compensate for any differences between the oscillator 26 and the oscillator of the device that originated the message. The major deficiency of this approach is that a significant time delay is introduced into the communication link and therefore can reduce the overall system bandwidth.

SUMMARY OF THE INVENTION

The invention is a method for tracking the frequency of a remote oscillator that has been used to generate a received message data stream. The method synchronizes the received message data stream to the frequency of a voltage controlled oscillator. The method also uses the synchronized received message data stream to generate a first time reference to sample the synchronized received message data stream into a sampler. The method further uses the voltage controlled oscillator frequency to generate a second time reference to read the synchronized received message data stream out of the sampler. The method also further uses the first and second time references to determine how much time has accumulated between the voltage controlled oscillator frequency and the remote oscillator frequency. The method further samples the accumulating time difference at a predetermined rate; and adjusts the voltage controlled oscillator frequency in steps each of a predetermined amount to substantially nullify the accumulating time difference.

The invention is also a method for tracking the frequency of a remote oscillator that has been used to generate a received message data stream. The method synchronizes the received message data stream to the frequency of a voltage controlled oscillator. The method also determines an accumulating difference in time between the voltage controlled oscillator Frequency and the remote oscillator frequency using both a first time reference that is generated from the synchronized received message data stream and a second time reference that is generated from the voltage controlled oscillator frequency. The method further samples the accumulating time difference at a predetermined rate. The method also further adjusts the voltage controlled oscillator frequency in steps each of a predetermined amount to substantially nullify the accumulating time difference.

The invention is further a method for tracking the frequency of a remote oscillator that has been used to generate a received message data stream. The method synchronizes the received message data stream to the frequency of a voltage controlled oscillator. The method also generates a first time reference from the synchronized received message data scream. The method further generates a second time reference from the voltage controlled oscillator frequency. The method also further determines an accumulating difference in tame between the voltage controlled oscillator frequency and the remote oscillator frequency using the first and second time references. The method further samples the accumulating time difference at a predetermined rate; and adjusts the voltage controlled oscillator frequency in steps each of a predetermined amount to substantially nullify the accumulating time difference.

An apparatus for tracking the frequency of a remote oscillator that has been used to generate a received message data stream. The apparatus has a voltage controlled oscillator having an adjustable frequency and a sampler. The apparatus also has a first circuit for synchronizing the received message data stream to the adjustable frequency of the voltage controlled oscillator and for generating from the synchronized received message data stream a first time reference to sample the synchronized received message data stream into the sampler and for generating from the voltage controlled oscillator frequency a second time reference to read the synchronized received message data stream out of the sampler. The apparatus further has a frequency discriminator responsive to the first and second time references to determine an accumulating difference in time between the voltage controlled oscillator adjustable frequency and the remote oscillator frequency, the frequency discriminator sampling the accumulating time difference at a predetermined rate; and a control loop to adjust the voltage controlled oscillator adjustable frequency in steps each of a predetermined amount to substantially nullify the accumulating time difference.

DESCRIPTION OF THE PREFERRED EMBODIMENT(S)

Figure 1:
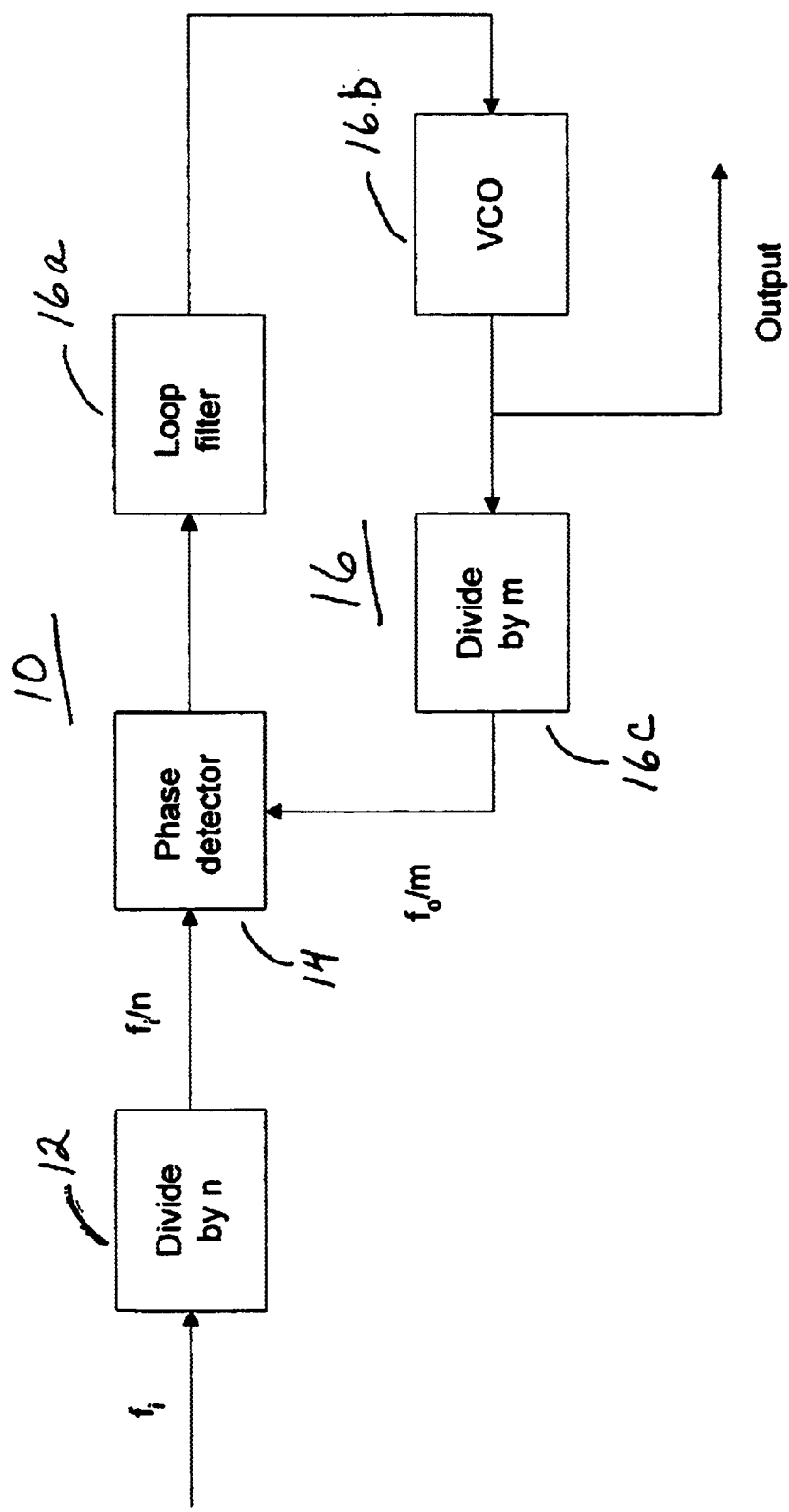
FIG. 1 is a block diagram of the prior art phase lock loop technique of frequency synthesis.
Figure 2:
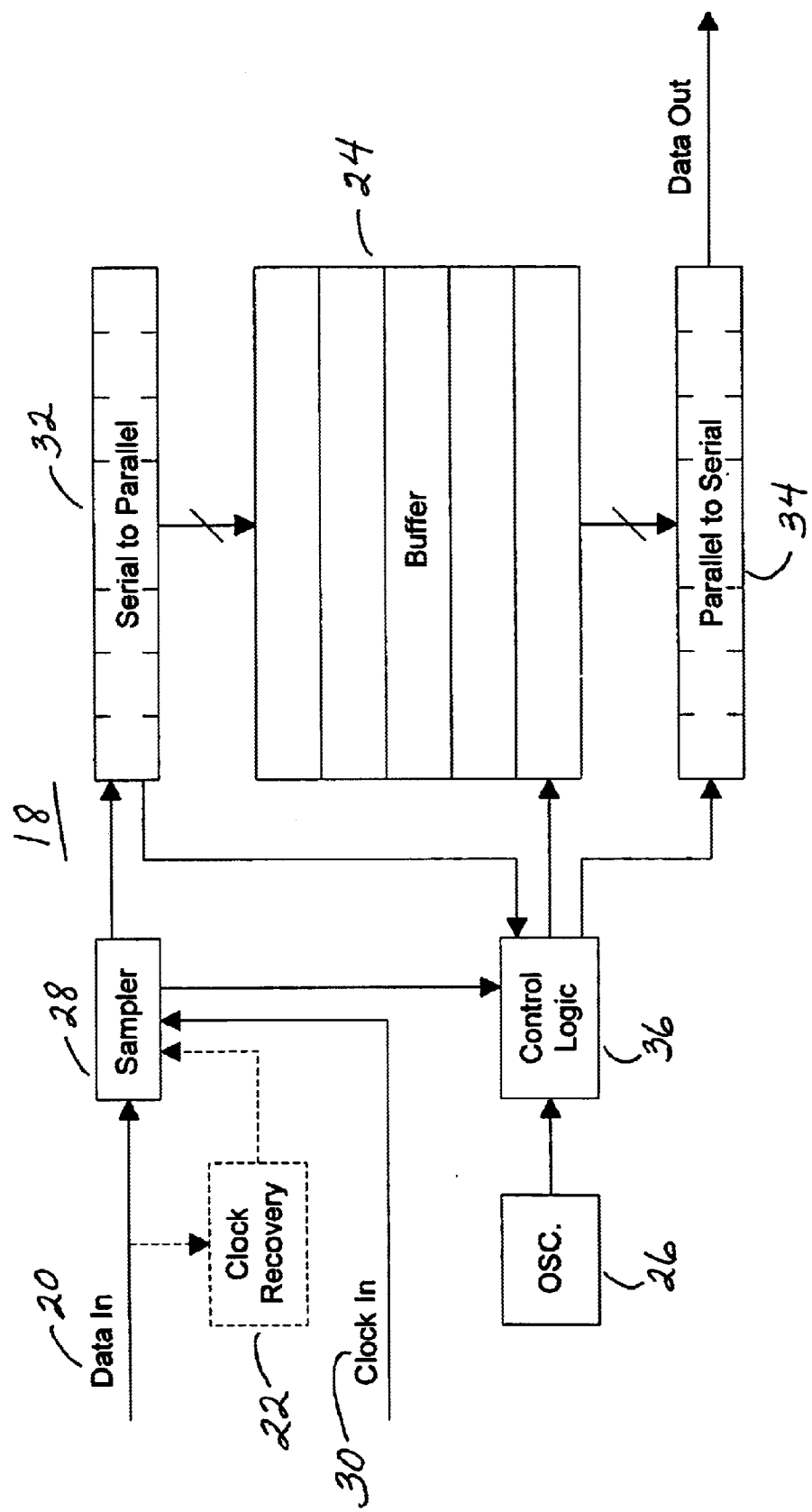
FIG. 2 is a block diagram of the embodiment for the prior art store forward technique of frequency synthesis.
Figure 3:
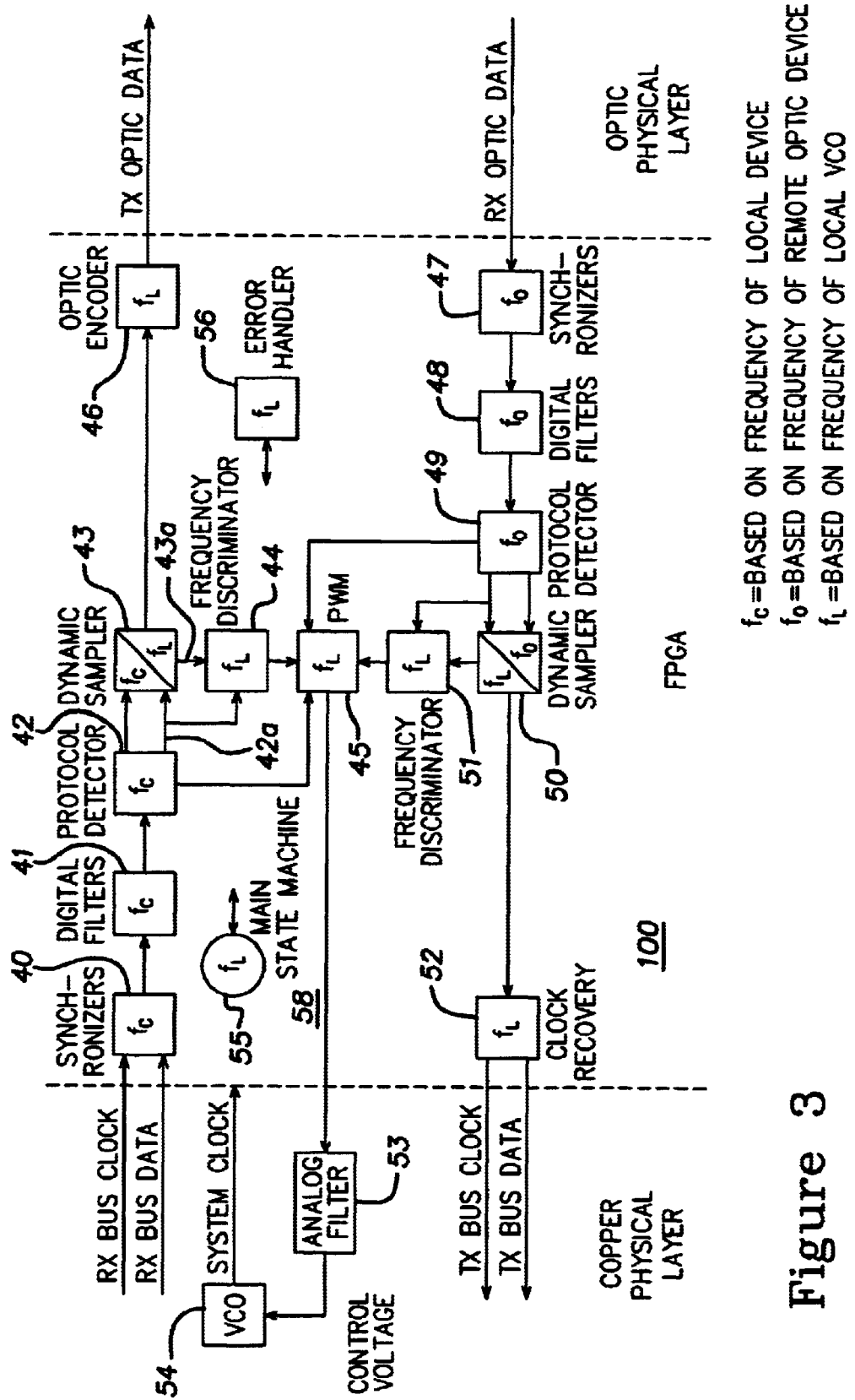
FIG. 3 is one embodiment for a fiber optic repeater that uses the frequency synthesis technique of the present invention.

Referring now to FIG. 3, there is shown one embodiment for a fiber optic repeater (RFO) that performs frequency synthesis in accordance with the present invention. The embodiment is divided into seventeen circuits 40–56, each of which has an associated function that is described below in more detail. The overall function of the frequency synthesis method of the present invention is to provide bi-directional communications from one copper bus to another copper bus by way of fiber optic cable for the purpose of replicating the communication bus in remote applications. In performing this function the present invention does not allow differences between oscillator frequencies of any device connected to the copper bus to eventually corrupt a data message. At the same time the present invention minimizes delay through the communication link to preserve system bandwidth.

The present invention accomplishes the foregoing by utilizing, as is described in more detail below, a voltage controlled oscillator (VCO) 54 and a field programmable gate array (FPGA) 100 comprising circuits 40–52 and 55–56 to adjust the frequency at which the unit operates to match the frequency of the device that generated the incoming data stream. This adjustment is performed on both data received from the copper bus or the fiber optic receiver on a message by message basis.

Figure 4:
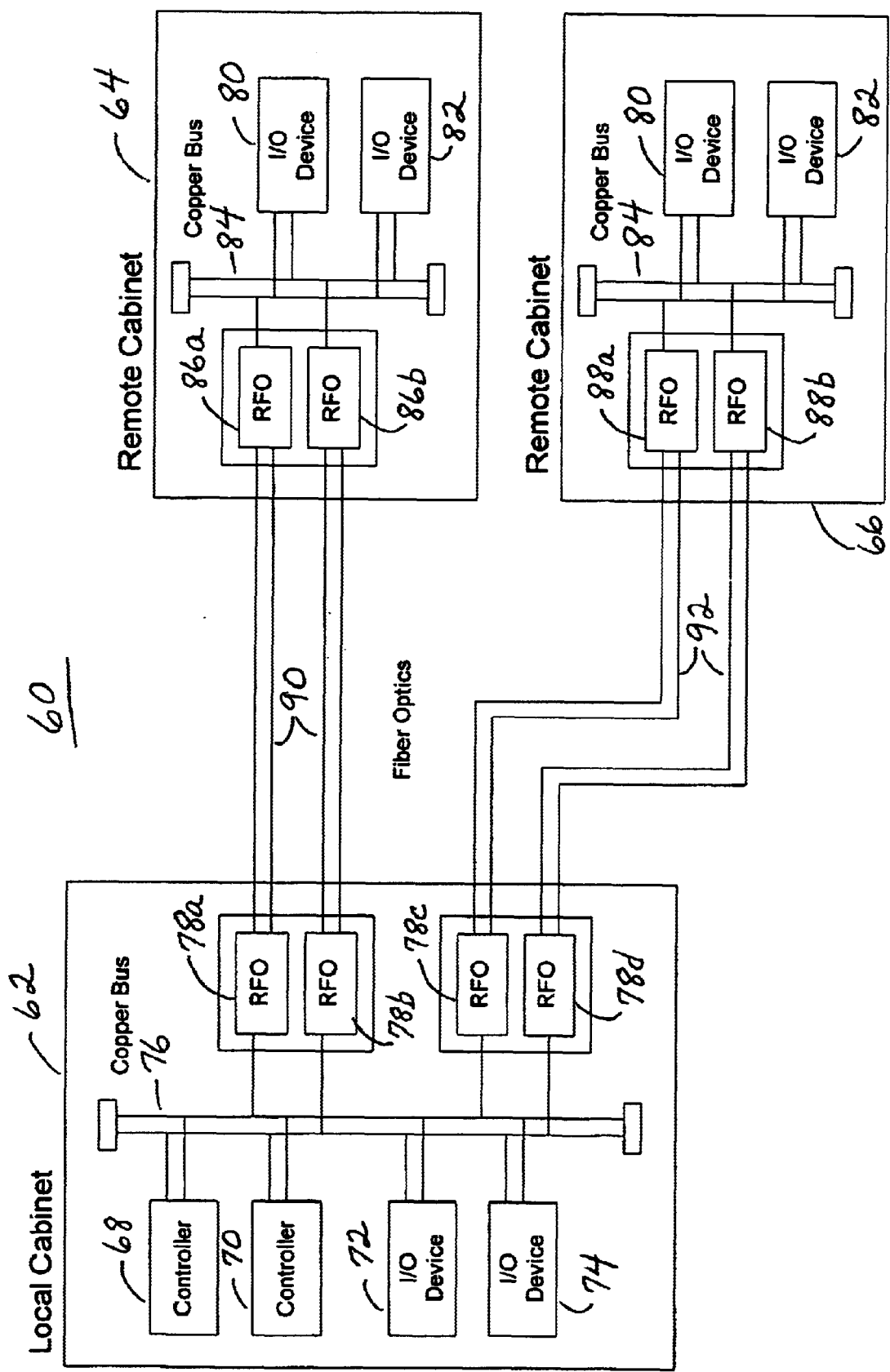
FIG. 4 is a one example of an industrial control system in which the fiber optic repeater can be used.

The present invention may be used to provide bi-directional communications in an industrial control system. Referring to FIG. 4, there is shown one example of an industrial control system 60. System 60 includes a local cabinet 62, and two remote cabinets 64 and 66. The local cabinet 62 has controllers 68 and 70, two input/output (I/O) devices 72 and 74, a copper bus 76 and four fiber optic repeaters (RFO) 78a–78d. Each of the remote cabinets 64 and 66 have two I/O devices 80 and 82, a copper bus 84 and two RFOs 86a–86b in cabinet 64 and 88a–88b in cabinet 66. The two RFOs 86a–86b and 88a–88b in each of the remote cabinets 64 and 66 are connected to the associated two RFOs 78a–78b and 78c–78d, respectively in cabinet 62 by an associated fiber optic cable 90 and 92. This connection of RFOs forms a redundant communication link in the industrial control system 60 and provides a seamless way to extend a communication bus to remote locations in such a system.

FIG. 3 shows the embodiment for each of RFOs 78a–78d, 86a–86b and 88a–88b of FIG. 4 in accordance with the frequency synthesis technique of the present invention. While the present invention is now described in connection with a single RFO communication link that description applies regardless of channel or the number of links.

The bi-directional communication from one copper bus to another copper bus in industrial control system 60 is accomplished through a RFO communication link. When the present invention is used in industrial control system 60, the direction data is transmitted and the arbitration for bus mastership are ultimately managed by the main state machine 55 of FIG. 3. The main state machine 55 of FIG. 3 receives information from the protocol detectors 42, 49, dynamic samplers 43, 50, and error handler circuit 56 of FIG. 3 in managing these functions. The main state machine 55 is associated with the high level functionality of the RFO and for providing the specific requirements of the proprietary communication protocol of the industrial control system 60. The main state machine 55 and the bus arbitration described above do not have any functionality that is associated with the frequency synthesis technique of the present invention.

When a data message originates from one side of a RFO communication link, synchronizing circuit 40 samples the incoming data stream at the system clock rate generated by the VCO 54. Circuit 40 includes two stages of flip-flops to synchronize the digitized data stream to thereby allow any meta-stable events to settle. The synchronized data stream then passes through circuit 41 which digitally filters any glitches that are less than a predetermined size that may have been sampled by synchronizing circuit 40. The incoming data stream then passes through the protocol detector 42 which determines if the incoming data stream is a message that needs to be retransmitted or a bus arbitration cycle.

If the protocol detector 42 determines that the data stream is a message that needs to be retransmitted the RFO starts to adjust the frequency of the VCO 54 to match the frequency of the device originating the message. This function is accomplished by the control loop 58 formed by the dynamic data sampler 43, frequency discriminator 44, pulse width modulator (PWM) 45, analog filter 53 and the VCO 54.

In addition, if protocol detector 42 determines that the incoming digitized data stream is a message, circuit 42 generates a syncing pulse at output 42a. It should be appreciated that the syncing pulse is relative to the incoming data stream but is synchronized to the frequency of VCO 54. Both the dynamic data sampler 43 and the frequency discriminator 44 use the syncing pulse as a time reference for the purpose of tracking the difference between the frequency of the RFO and the devices originating the message.

If protocol detector circuit 42 determines that a bus arbitration cycle is in process, no adjustments are made in the frequency of VCO 54. Arbitration is managed by the main state machine 55.

The core of the dynamic sampler 43, is similar to a dual port first in first out (FIFO) buffer. Circuit 43 samples data into the buffer by using the sync pulse generated by circuit 42. This is effectively sampling data into the buffer relative to the frequency of the originating device although synchronized to the RFO oscillator 54. Data is sampled into the buffer until it is half full.

Once the buffer is half full the sampler starts to sample data out of the buffer using a syncing pulse as a second time reference that is based on the frequency of the VCO 54. The data sampled out of the buffer is sent to the optic encoder 46. This form of sampling by circuit 43 allows the data to be retransmitted without jitter. The buffer is sized to allow enough time for the frequency adjustment to occur without over-flowing or under-flowing the buffer. As the data is being sampled out of the buffer, the dynamic sampler 43 generates at output 43a the syncing pulse which is the second time reference.

The syncing pulses from the protocol detector 42 and dynamic sampler 43 are used by the frequency discriminator 44 to determine how much time has accumulated from the difference in frequency between the VCO 54 and the oscillator of the originating device during a message. The accumulated time is the clock skew, that is, how far apart the clock produced by VCO 54 is from the clock produced by the oscillator of the originating device. This measurement, which is used to set the duty cycle of the pulse width modulator (PWM) 45 and by control loop 58 adjust the frequency of VCO 54 so that the skew is substantially nullified, has the resolution of one system clock period. Therefore at least one system clock period of clock skew must accumulate before the RFO can determine if any adjustments are necessary.

During a message the frequency discriminator circuit 44 samples the accumulating clock skew at a predetermined rate. This rate is set so as not to exceed the response of the analog filter 53 and the bandwidth of the control voltage circuit of VCO 54 allowing the system enough time to settle to the new frequency of the VCO 54 after any adjustments to the PWM 45. The frequency discriminator circuit 44 is sized to allow for the detection of worst case clock skew in both positive and negative directions relative to the RFO, that is, for messages of an unlimited size.

During a message if circuit 44 detects the accumulation of clock skew it adjusts the duty cycle of PWM 45 in the direction that substantially nullifies the clock skew. Since PWM 45 and VCO 54 are part of control loop 57 an adjustment of the duty cycle of PWM 45 is also an adjustment of the frequency of VCO 54. Thus the frequency of the VCO 54 is adjusted to that frequency which substantially nullifies the clock skew.

Each adjustment is of a fixed predetermined amount. If the frequency discriminator 44 samples any additional changes in the accumulated clock skew during a message it makes additional adjustments to the PWM 45 and thus to the frequency of VCO 54 in that direction which substantially nullifies the clock skew until the message is complete. Once the message is complete the PWM 45 is reset to its nominal setting and the VCO 54 returns to its nominal frequency and the RFO waits for the next message.

The output of PWM 45 has a fixed predetermined period and normally produces a 50 percent duty cycle. This produces a nominal system frequency from the VCO 54. The adjustment span of PWM 45 is constrained so that the output of the analog filter circuit 53 does not produce a signal that would exceed the limits of the control voltage input of the VCO 54. The VCO's frequency range or pullability is selected so as to be able to compensate for the worst case frequency difference between the RFO and any device originating a message on the bus with no limit on the size of the message. The analog filter circuit 53 is essentially a low pass filter that converts the digital output of the PWM 45 to the DC analog signal that controls the VCO 54.

The optic encoder 46 receives data from the dynamic sampler 43, and encodes the data for transmission in a manner compatible with the optic interface. This data is sent to the remote RFO and is sampled by synchronizing circuit 47 of the remote RFO. The process described above is performed on the optic data stream being received with one exception. The data that is sampled out of the dynamic sampler 50, is sent to, circuit 52, where the clock is recovered from the data stream. Once the clock has been recovered both the clock and the data are transmitted onto the remote copper bus.

The error handler 56 is used to manage a number of fault conditions in a deterministic manner by notifying the main state machine 55 of the existence of a fault condition. This allows the main state machine 55 to enter a safe state until the fault is cleared.

It is to be understood that the description of the preferred embodiment(s) is (are) intended to be only illustrative, rather than exhaustive, of the present invention. Those of ordinary skill will be able to make certain additions, deletions, and/or modifications to the embodiment(s) of the disclosed subject matter without departing from the spirit of the invention or its scope, as defined by the appended claims.

What is claimed is:

1. A method for tracking the frequency of a remote oscillator that has been used to generate a received message data stream comprising:

synchronizing said received message data stream to the frequency of a voltage controlled oscillator;

using said synchronized received message data stream to generate a first time reference to sample said synchronized received message data stream into a sampler;

using said voltage controlled oscillator frequency to generate a second time reference to read said synchronized received message data stream out of said sampler;

using said first and second time references to determine how much time has accumulated from the difference between said voltage controlled oscillator frequency and said remote oscillator frequency;

sampling said accumulating time difference at a predetermined rate; and adjusting said voltage controlled oscillator frequency in steps each of a predetermined amount to substantially nullify said accumulating time difference.

2. The method of claim 1 further comprising encoding said synchronized received message data stream read out of said sampler for transmission to a remote device.

3. The method of claim 2 further comprising transmitting to said remote device said encoded synchronized received message data stream read out of said sampler.

4. The method of claim 3 wherein said transmission to said remote device is by a fiber optics cable.

5. The method of claim 1 wherein said synchronizing of said received message data stream to said voltage controlled oscillator frequency comprises sampling said received message data stream at a clock rate generated by said voltage controlled oscillator and said method further comprises recovering the clock from said synchronized received message data stream read out of said sampler.

6. A method for tracking the frequency of a remote oscillator that has been used to generate a received message data stream comprising; colon synchronizing said received message data stream to the frequency of a voltage controlled oscillator;

determining an accumulating difference in time between said voltage controlled oscillator frequency and said remote oscillator frequency using both a first time reference that is generated front said synchronized received message data stream and a second time reference that is generated from said voltage controlled oscillator frequency;

sampling said accumulating time difference at a predetermined rate; and adjusting said voltage controlled oscillator frequency in steps each of a predetermined amount to substantially nullify said accumulating time difference.

7. The method of claim 6 wherein said determining an accumulated difference in time includes:
  using said first time reference to sample said synchronized received message data stream into a sampler;
  using said second time reference to read said synchronized received message data stream out of said sampler; and
  determining said accumulating difference using both said first and said second time references.

8. The method of claim 7 further comprising encoding said synchronized received message data stream read out of said sampler for transmission to a remote device.

9. The method of claim 8 further comprising transmitting to said remote device said encoded synchronized received message data stream read out of said sampler.

10. The method of claim 9 wherein said transmission to said remote device is by a fiber optics cable.

11. The method of claim 7 wherein said synchronizing of said received message data stream to said voltage controlled oscillator frequency comprises sampling said received message data stream at a clock rate generated by said voltage controlled oscillator and said method further comprises recovering the clock from said synchronized received message data stream read out of said sampler.

12. A method for tracking the frequency of a remote oscillator that has been used to generate a received message data stream comprising:
  synchronizing said received message data stream to the frequency of a voltage controlled oscillator;
  generating a first time reference from said synchronized received message data stream;
  generating a second time reference from said voltage controlled oscillator frequency;
  determining an accumulating difference in time between said voltage controlled oscillator frequency and said remote oscillator frequency using said first and second time references;
  sampling said accumulating time difference at a predetermined rate; and
  adjusting said voltage controlled oscillator frequency in steps each of a predetermined amount to substantially nullify said accumulating time difference.

13. The method of claim 12 wherein prior to said determining an accumulated difference in time said first time reference is used to sample said synchronized received message data stream into a sampler and said second time reference is used to read said synchronized received message data stream out of said sampler.

14. The method of claim 13 further comprising encoding said synchronized received message data stream read out of said sampler for transmission to a remote device.

15. The method of claim 14 further comprising transmitting to said remote device said encoded synchronized received message data stream read out of said sampler.

16. The method of claim 15 wherein said transmission to said remote device is by a fiber optics cable.

17. The method of claim 13 wherein said synchronizing of said received message data stream to said voltage controlled oscillator frequency comprises sampling said received message data stream at a clock rate generated by said voltage controlled oscillator and said method further comprises recovering the clock from said synchronized received message data stream read out of said sampler.

18. An apparatus for tracking the frequency of a remote oscillator that has been used to generate a received message data stream comprising:
  a voltage controlled oscillator having an adjustable frequency;
  a sampler;
  a first circuit for synchronizing said received message data stream to said adjustable frequency of said voltage controlled oscillator and for generating from said synchronized received message data stream a first time reference to sample said synchronized received message data stream into said sampler and for generating from said voltage controlled oscillator frequency a second time reference to read said synchronized received message data stream out of said sampler;
  a frequency discriminator responsive to said first and second time references to determine an accumulating difference in time between said voltage controlled oscillator adjustable frequency and said remote oscillator frequency, said frequency discriminator sampling said accumulating time difference at a predetermined rate; and
  a control loop to adjust said voltage controlled oscillator adjustable frequency in steps each of a predetermined amount to substantially nullify said accumulating time difference.

* * * * *